E. A. Chaniergy,

Governor.

No. 106,658. Patented Aug. 23, 1870.

Witnesses.
J. H. Shumway.
a. J. Tibbits

Inventor.
Edwin Augustus Chaniergy
By Atty
John E. Earle

United States Patent Office.

EDME AUGUSTIN CHAMEROY, OF PARIS, FRANCE.

Letters Patent No. 106,658, dated August 23, 1870.

IMPROVEMENT IN APPARATUS FOR GAUGING OR REGULATING THE FLOW OF WATER OR OTHER FLUIDS.

The Schedule referred to in these Letters Patent and making part of the same.

*To all whom it may concern:*

Be it known that I, EDME AUGUSTIN CHAMEROY, of Paris, in the Empire of France, have invented new and useful Improvements in Means and Apparatus for Gauging or Regulating the Flow of Water or other Liquids; and I do hereby declare the following to be a true and lawful description of the same, reference being had to the accompanying drawing, that is to say—

My improved system of gauging is intended to remedy the irregularities at present existing in our water supply, by rendering the flow from the orifice of the meter constant, notwithstanding the variations of pressure in the distribution-pipes.

My invention may be carried out in two ways; first, the apparatus is independent of the pipe through which the water is supplied, in which case the meter acts in free air; and, second, the meter works under pressure.

Gauging Under Pressure.

Figure 1:
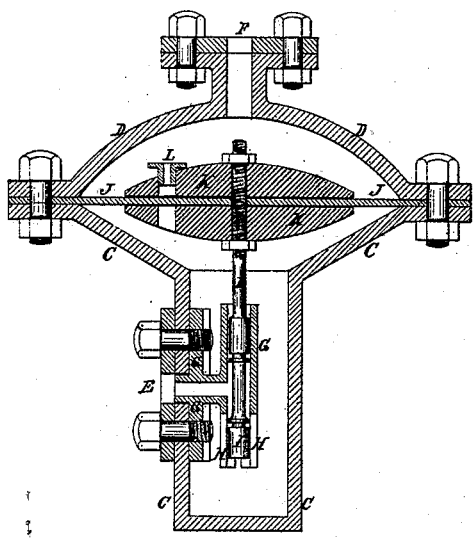
Figure 2:
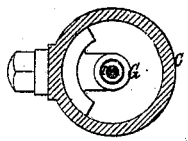

(See the vertical section, Figure 1, and cross-section, Figure 2.)

C, cast-iron box, concave at its upper part.

D, cover of the box C, with which it is connected by a flanged joint.

E, entrance for the water.

F, exit of the water.

G, distributer, perforated at the center with an orifice corresponding with the entrance of the water.

H H, square or rectangular orifices, pierced at the base of the distributer G.

I, spindle, passing over the orifice of distribution, which acts as a regulator of the flow of the water.

J, diaphragm, in copper or India rubber, forming a flexible division between the box C and the cover D.

K K, metallic disks, acting as weights, joined together by the screw and nuts on the spindle I. The flexible diaphragm J is inclosed between these two metallic disks.

L, orifice of the gauge, from which there is an invariable flow.

Action of the Apparatus.

The apparatus is attached to the supply-pipes by the entry E and the exit F. The water passing through the distributer G will flow through the orifices H H, then through the orifice of the gauge L, but at the same time it will press upward upon the surface of the disks K K, to form an equilibrium to their weight.

When this pressure gets greater than this weight, the disks K, by reason of the flexibility of the diaphragm J, will rise vertically, producing a diminution of the flow of water through the orifices H H, until the instant when the pressure of the water will equalize the weight of the disks K. Consequently, the difference of pressure or the loss of pizometrical head between the top and bottom of the disks K, that is to say, between the high and low pressure at the orifice of the gauge L will be invariable, thus causing the flow to be constant also.

This hydraulic phenomenon possesses great sensitiveness. A change of pressure of a few centimetres only will suffice for an exact meter, able to be affixed to a pipe at any point.

This arrangement of meter under pressure applied to the overflows of canals for the supply of mills, or for any other purpose, will have the same effect, by supplying (whatever may be the variation of the high and low levels) the same quantity of water. In this case the apparatus may be modified in two ways.

I claim—

The box C D, provided with the inlet E and outlets F, combined with the distributer G, arranged with orifices H, spindle I, and weighted diaphragm J, substantially as and for the purpose specified.

In testimony whereof I have signed my name to this specification before two subscribing witnesses.

E. A. CHAMEROY.

Witnesses:
C. LAFOND,
J. U. ZUST.